United States Patent
Chang (10) Patent No.: US 12,455,336 B2
(45) Date of Patent: Oct. 28, 2025

(54) METHODS, APPARATUSES, SYSTEMS, AND COMPUTER-READABLE MEDIUMS FOR MAGNETIC RESONANCE IMAGING WITH PHASE DIFFERENCE OPERATION

(71) Applicant: Siemens Healthineers AG, Forchheim (DE)

(72) Inventor: Yulin Chang, Belmont, MA (US)

(73) Assignee: Siemens Healthineers AG, Forchheim (DE)

( * ) Notice: Subject to any disclaimer, the term of this patent is extended or adjusted under 35 U.S.C. 154(b) by 198 days.

(21) Appl. No.: 18/520,747

(22) Filed: Nov. 28, 2023

(65) Prior Publication Data

US 2025/0172646 A1    May 29, 2025

(51) Int. Cl.
*G01R 33/56* (2006.01)
*G01R 33/561* (2006.01)

(52) U.S. Cl.
CPC ..... *G01R 33/5608* (2013.01); *G01R 33/5616* (2013.01)

(58) Field of Classification Search
CPC .......... G01R 33/5608; G01R 33/5616
See application file for complete search history.

(56) References Cited

U.S. PATENT DOCUMENTS 8,497,681 B2    7/2013  Feiweier
9,709,641 B2 *  7/2017  Sato ............... G01R 33/243
2009/0256567 A1 * 10/2009  Aksit ............. G01R 33/5616
                                                        324/312
2020/0018809 A1 *  1/2020  Duijndam ...... G01R 33/56518

OTHER PUBLICATIONS

Bernstein, Matt A., et al. "Reconstructions of phase contrast, phased array multicoil data." Magnetic resonance in medicine 32.3 (1994): 330-334.
Robinson, Simon, et al. "Combining phase images from multi-channel RF coils using 3D phase offset maps derived from a dual-echo scan." Magnetic resonance in medicine 65.6 (2011): 1638-1648.
Eckstein, Korbinian, et al. "Computationally efficient combination of multi-channel phase data from multi-echo acquisitions (ASPIRE)." Magnetic resonance in medicine 79.6 (2018): 2996-3006.
Conturo, Thomas E., and Gregory D. Smith. "Signal-to-noise in phase angle reconstruction: dynamic range extension using phase reference offsets." Magnetic Resonance in Medicine 15.3 (1990): 420-437.

* cited by examiner

Primary Examiner — Gregory H Curran (57) ABSTRACT

A method of generating a phase image of a region of interest of a patient, comprises: obtaining a plurality of adjusted magnetic resonance (MR) signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels; and generating the phase image based on the plurality of adjusted MR signal vectors.

20 Claims, 7 Drawing Sheets

METHODS, APPARATUSES, SYSTEMS, AND COMPUTER-READABLE MEDIUMS FOR MAGNETIC RESONANCE IMAGING WITH PHASE DIFFERENCE OPERATION

TECHNICAL FIELD

Example embodiments relate to magnetic resonance (MR) imaging, such as multi-channel MRI with multiple echoes.

BACKGROUND

Most magnetic resonance (MR) images that are displayed are magnitude images. However, the phase of an MR image is a component of MR that represents the underlying local magnetic fields $B_0$. Knowledge of such local fields is useful in MR applications such as mapping of susceptibility, quantification of flow, and corrections of imaging artifacts and/or distortion. Phase-related MR applications generally involve at least two sets of scans to remove the background phase by computing the phase difference between the two scans. An example of a phase-related MR application is field mapping using two echoes at different echo times ("dual-echo").

SUMMARY

At least one example embodiment provides a method of generating a phase image of a region of interest of a patient, the method comprising: obtaining a plurality of adjusted magnetic resonance (MR) signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels; and generating the phase image based on the plurality of adjusted MR signal vectors.

At least one other example embodiment provides an image processing system to generate a phase image of a region of interest of a patient, the image processing system comprising: a memory storing computer-readable instructions; and at least one processor configured to execute the computer-readable instructions to cause the image processing system to obtain a plurality of adjusted MR signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels, and to generate the phase image based on the plurality of adjusted MR signal vectors.

At least one other example embodiment provides a non-transitory computer-readable storage medium storing computer-readable instructions that, when executed by at least one processor at an imaging processing system, cause the imaging processing system to perform a method of generating a phase image of a region of interest of a patient, the method comprising: obtaining a plurality of adjusted MR signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels; and generating the phase image based on the plurality of adjusted MR signal vectors.

At least one other example embodiment provides an image processing system to generate a phase image of a region of interest of a patient, the image processing system comprising: means for obtaining a plurality of adjusted MR signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels; and means for generating the phase image based on the plurality of adjusted MR signal vectors.

At least one other example embodiment provides an imaging system comprising: a MR acquisition device having a plurality of channels, the MR acquisition device configured to acquire multi-echo MR imaging data for a region of interest of a patient, the multi-echo MR imaging data including a plurality of MR signal vectors; and an image processing system to generate a phase image of the region of interest of the patient. The image processing system includes a memory storing computer-readable instructions, and at least one processor. The at least one processor is configured to execute the computer-readable instructions to cause the image processing system to: obtain a plurality of adjusted MR signal vectors by adjusting lengths of the plurality of MR signal vectors, wherein a length of a first of the plurality of MR signal vectors is adjusted based on a first signal-to-noise ratio for a first component MR signal vector on a first of the plurality of channels and a second signal-to-noise ratio for a second component MR signal vector on the first of the plurality of channels; and generate the phase image based on the plurality of adjusted MR signal vectors.

At least one other example embodiment provides an imaging system comprising: a means for acquiring multi-echo MR imaging data for a region of interest of a patient, the multi-echo MR imaging data including a plurality of MR signal vectors, and the means for acquiring having a plurality of channels; and a means for generating a phase image of the region of interest of the patient. The means for generating includes: a means for obtaining a plurality of adjusted MR signal vectors by adjusting lengths of the plurality of MR signal vectors, wherein a length of a first of the plurality of MR signal vectors is adjusted based on a first signal-to-noise ratio for a first component MR signal vector on a first of the plurality of channels and a second signal-to-noise ratio for a second component MR signal vector on the first of the plurality of channels; and a means for generating the phase image based on the plurality of adjusted MR signal vectors.

BRIEF DESCRIPTION OF THE DRAWINGS

Other objects and features of the present invention will become apparent from the following detailed description considered in conjunction with the accompanying drawings. The drawings, however, are only examples and schematic solely for the purpose of illustration and do not limit the present invention. In the drawings.

DETAILED DESCRIPTION

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Independent of the grammatical term usage, individuals with male, female or other gender identities are included within the term.

Although example embodiments may be described with regard to field mapping applications in the context of multi-channel receive coils in magnetic resonance (MR) imaging (MRI), it should be understood that example embodiments may be applied in other scenarios where vector addition is used for phase averaging (e.g., flow quantification, susceptibility weighted imaging, etc.).

As noted similarly above, MR phase-related applications generally involve at least two sets of scans to remove the background phase by computing the phase difference between the two scans. In modern MR imaging, the phase difference, which is physically meaningful, is often subsequently averaged across receive channels to improve accuracy. Unlike magnitude images, phase images are averaged across channels with vector addition (e.g., $z=z_1+z_2$) to reduce the uncertainty of the phase angle.

Figure 1:
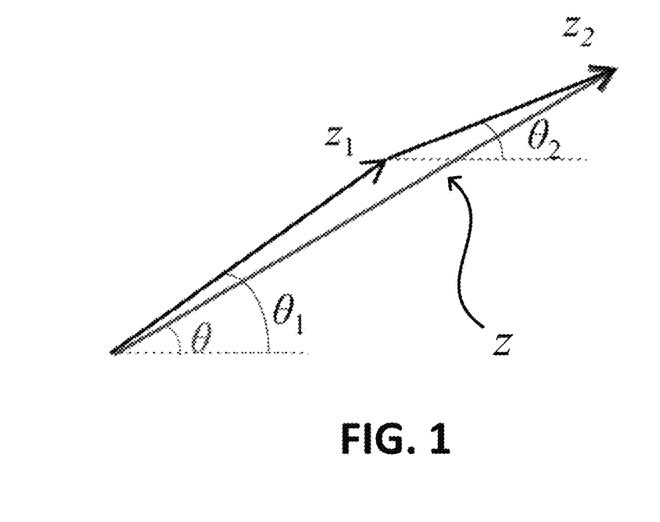
FIGS. 1 and 2 illustrate examples vector addition for averaging phase images.

FIG. 1 illustrates an example of vector addition for averaging of phase images. As shown in FIG. 1, the phase $\theta$ of the final vector z is averaged over the component vectors $z_1$ (with phase $\theta_1$) and $z_2$ (with phase $\theta_2$), to suppress noise in the phases of the component vectors $z_1$ and $z_2$. The component vector $z_1$ is given by the complex equation $z_1=x_1+iy_1$ and the component vector and $z_2$ is given by the complex equation $z_2=x_2+iy_2$.

When using the vector addition method, the relative lengths of the component vectors may influence the uncertainty of the resultant vector since the longer component vector has more weight on the phase of the resultant vector. If a component vector has a much higher uncertainty in phase and is much longer than the other component vector, then the uncertainty of the resultant vector will be dominated by the uncertainty of the longer component vector rendering such vector addition less effective in improving the accuracy of the phase of the resultant vector. This is exemplified in FIG. 2, which illustrates another example of vector addition for averaging of phase images.

Figure 2:
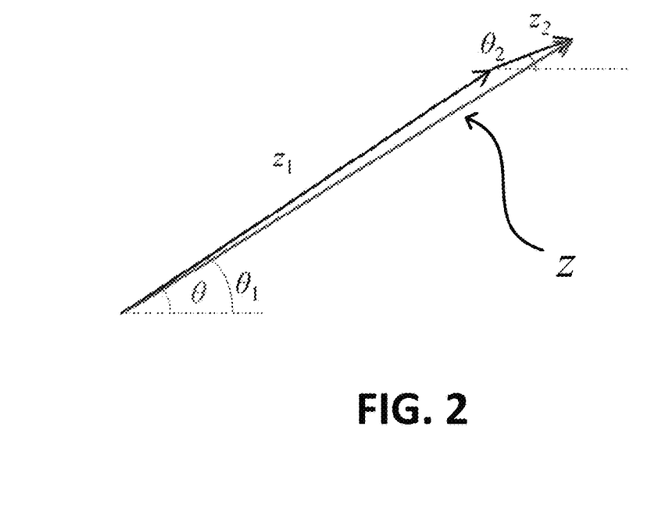

Referring to FIG. 2, component vector $z_1$ has substantially higher uncertainty in phase and is substantially longer than component vector $z_2$. As a result, the uncertainty of the resultant vector z is dominated by the uncertainty of the component vector $z_1$ rendering this vector addition less effective in improving the accuracy of the phase of the resultant vector z.

A more detailed analysis of vector addition in the presence of uncertainty is provided below.

TO determine the phase uncertainty of the resultant vector $z=z_1+z_2$, with phase $\theta$, after the addition of the component vectors $z_1=x_1+iy_1$ and $z_2=x_2+iy_2$ (e.g., as shown in FIGS. 1 and 2), the phase $\theta$ of the resultant vector z is obtained according Equation (1) shown below.

$$\theta = \arg(z_1 + z_2) = \tan^{-1}\frac{y_1+y_2}{x_1+x_2} = \tan^{-1}\frac{y}{x} \quad (1)$$

Given the above in Equation (1), d$\theta$ is given as shown below in Equation (2).

$$d\theta = \frac{d\theta}{d\left(\frac{y}{x}\right)}\left(\frac{\partial\left(\frac{y}{x}\right)}{\partial x}dx + \frac{\partial\left(\frac{y}{x}\right)}{\partial y}dy\right) = \quad (2)$$

$$\frac{x^2}{x^2+y^2}\left(-\frac{y}{x^2}dx + \frac{1}{x}dy\right) = \frac{1}{|z|^2}(-y(dx_1+dx_2) + x(dy_1+dy_2))$$

Given the above in Equations (1) and (2), the phase variance $\sigma^2(\theta)$ for the resultant vector z may be given by Equation (3) shown below.

$$\sigma^2(\theta) = \frac{1}{|z|^4}\big(y^2(\sigma^2(x_1)+\sigma^2(x_2)+2dx_1dx_2) + \quad (3)$$

$$x^2(\sigma^2(y_1)+\sigma^2(y_2)+2dy_1dy_2) - 2xy(dx_1+dx_2)(dy_1+dy_2)\big)$$

In this example, it is assumed there is no correlation between the summed component vectors $z_1$ and $z_2$, and there is no correlation between the x and y components of each component vector. As a result, the cross terms disappear. Further, since the variance of each of the x and y components of each component vector equals the variance of the magnitude of the component vector (i.e., $\sigma^2(x_1)=\sigma^2(y_1)=\sigma^2(|z_1|)$ and $\sigma^2(x_2)=\sigma^2(y_2)=\sigma^2(|z_2|)$), Equation (3) can be simplified as shown below in Equation (4).

$$\sigma^2(\theta) = \frac{1}{|z|^4}\left((x^2+y^2)(\sigma^2(|z_1|)+\sigma^2(|z_2|))\right) = \frac{\sigma^2(|z_1|)+\sigma^2(|z_2|)}{|z|^2} \quad (4)$$

Given Equation (4), the phase uncertainty σ(θ) for the resultant vector z is computed based on the variance of the magnitude of each component vector $z_1$ and $z_2$ and the magnitude of the resultant vector z as shown below in Equation (5).

$$\sigma(\theta) = \frac{\sqrt{\sigma^2(|z_1|)+\sigma^2(|z_2|)}}{|z|} \quad (5)$$

In MR imaging, having calculated the phase uncertainty σ(θ) as discussed above, the addition of two vectors of variable phase uncertainties is considered at least because a MR signal (signal vector), for example, may have a relatively small length, but relatively high accuracy (relatively low uncertainty) while another vector may have a relatively large length, but relatively low accuracy (relatively high uncertainty). If these two component signal vectors are to be added to obtain a resultant vector for a phase angle, the more accurate component signal vector should be amplified while the less accurate component signal vector should be suppressed to improve accuracy (reduce uncertainty). Otherwise, the resultant signal vector may be dominated by the component signal vector with high uncertainty, which may lead to reduced accuracy for phase calculation and generation of resultant phase images (discussed later). Below, an example embodiment of a more general method for obtaining relative lengths of signal vectors for averaging by vector addition is discussed. By virtue of the example embodiment discussed below, relative lengths of component vectors that reduce and/or minimize the uncertainty of the phase of the resultant vector when averaged by vector addition may be obtained.

In this example, the two component vectors $z_1$ and $z_2$ are again given by $z_1=x_1+iy_1$ and $z_2=x_2+iy_2$, and expected to be along the same orientation with phase uncertainties of σ($θ_1$) and σ($θ_2$), respectively. For simplicity, the length of the first component vector $|z_1|=1$ and the ratio of the lengths of the component vectors is $r=|z_2|/|z_1|$, such that the length of the resultant signal vector $|z|=|1+r|$ and the phase variance $\sigma^2(\theta)$ for the resultant signal vector z is given by Equation (6) shown below.

$$\sigma^2(\theta) = \frac{\sigma^2(|z_1|)+\sigma^2(|z_2|)}{|z|^2} \quad (6)$$
$$= \frac{\sigma^2(\theta_1)|z_1|^2+\sigma^2(\theta_2)|z_2|^2}{(1+r)^2}$$
$$= \frac{\sigma^2(\theta_1)+\sigma^2(\theta_2)r^2}{(1+r)^2}$$

In view of the above, the minimum phase variance $\sigma^2(\theta)$ is obtained when the ratio r satisfies Equation (7) shown below.

$$\frac{d\sigma^2(\theta)}{dr} = \quad (7)$$
$$\frac{2r\sigma^2(\theta_2)(1+r)^2-2(1+r)(\sigma^2(\theta_1)+\sigma^2(\theta_2)r^2)}{(1+r)^4} = \frac{2r\sigma^2(\theta_2)-2\sigma^2(\theta_1)}{(1+r)^4} = 0$$

Given the above, it can be seen that the minimum phase variance $\sigma^2(\theta)$ is achieved when the ratio r of the lengths of the two component vectors being summed is inversely proportional to the ratio of the phase variance of the respective signal vectors being summed or proportional the ratio of the square of the signal-to-noise ratio ($SNR^2$) of the magnitudes of the component signal vectors being summed. In other words, the minimum phase variance $\sigma^2(\theta)$ is achieved when r is given by Equation (8) shown below.

$$r = \frac{|z_2|}{|z_1|} = \frac{\sigma^2(\theta_1)}{\sigma^2(\theta_2)} = \frac{SNR_2^2}{SNR_1^2} \quad (8)$$

In Equation (8), $θ_1$ is the phase of the first component vector $z_1$, $θ_2$ is the phase of the second component vector $z_2$, $SNR_1$ is the signal-to-noise ratio (SNR) of the magnitude of the first component vector $z_1$, and $SNR_2$ is the SNR of the magnitude of the second component vector $z_2$.

Using the above-discussed SNR-squared weighting to set the lengths of the component vectors being added, the phase uncertainty σ(θ) of the resultant signal vector is given by Equation (9) shown below.

$$\sigma(\theta) = \frac{\sigma(\theta_1)\sigma(\theta_2)}{\sqrt{\sigma^2(\theta_1)+\sigma^2(\theta_2)}} = \frac{1}{\sqrt{\frac{1}{\sigma^2(\theta_1)}+\frac{1}{\sigma^2(\theta_2)}}} = \frac{1}{\sqrt{SNR_1^2+SNR_2^2}} \quad (9)$$

Thus, according to one or more example embodiments, the minimum phase uncertainty σ(θ) for a resultant vector $z=z_1+_2$ is obtained when the ratio r of the lengths of the component signal vectors $$\left(\frac{|z_2|}{|z_1|}\right)$$

is inversely proportional to the ratio of the phase variance $\sigma^2(\theta)$ of the respective component signal vectors $$\left(\frac{\sigma^2(\theta_1)}{\sigma^2(\theta_2)}\right)$$

being added, or proportional the ratio of the square of the SNR of the magnitudes of the respective component signal vectors being added. In a more specific example, the minimum phase uncertainty σ(θ) for a resultant signal vector may be obtained by setting the length of each respective component signal vector based on the square of the SNR for that vector, or more specifically, by setting the length of the respective component signal vector to the square of the SNR for the magnitude of the signal vector (e.g., $|z_1|=SNR_1^2$ and $|z_2|=SNR_2^2$).

One or more example embodiments utilize and apply the concepts discussed above practically in generating resultant phase images based on multi-channel MR acquisition data of a patient obtained using multiple echoes. In at least one example embodiment, a resultant phase image of a region of interest (ROI) of a patient may be obtained by scaling and/or adjusting the lengths of the resultant MR signal vectors for each channel based on the SNR (e.g., $SNR^2$) for the magnitudes of the respective channel to obtain adjusted MR signal vectors, and then averaging the adjusted MR signal vectors across the channels using vector addition. More generally, for example, a resultant phase image may be obtained by scaling and/or adjusting the lengths of the resultant MR signal vectors for each channel based on a signal parameter (e.g., SNR) associated with the respective channel to obtain adjusted MR signal vectors, and then averaging the adjusted MR signal vectors across the channels using vector addition.

By virtue of one or more example embodiments, noise in the phases of the component vectors may be suppressed and the certainty of the resultant vector increased, thereby improving, for example, image quality in phase contrast images.

Figure 3A:
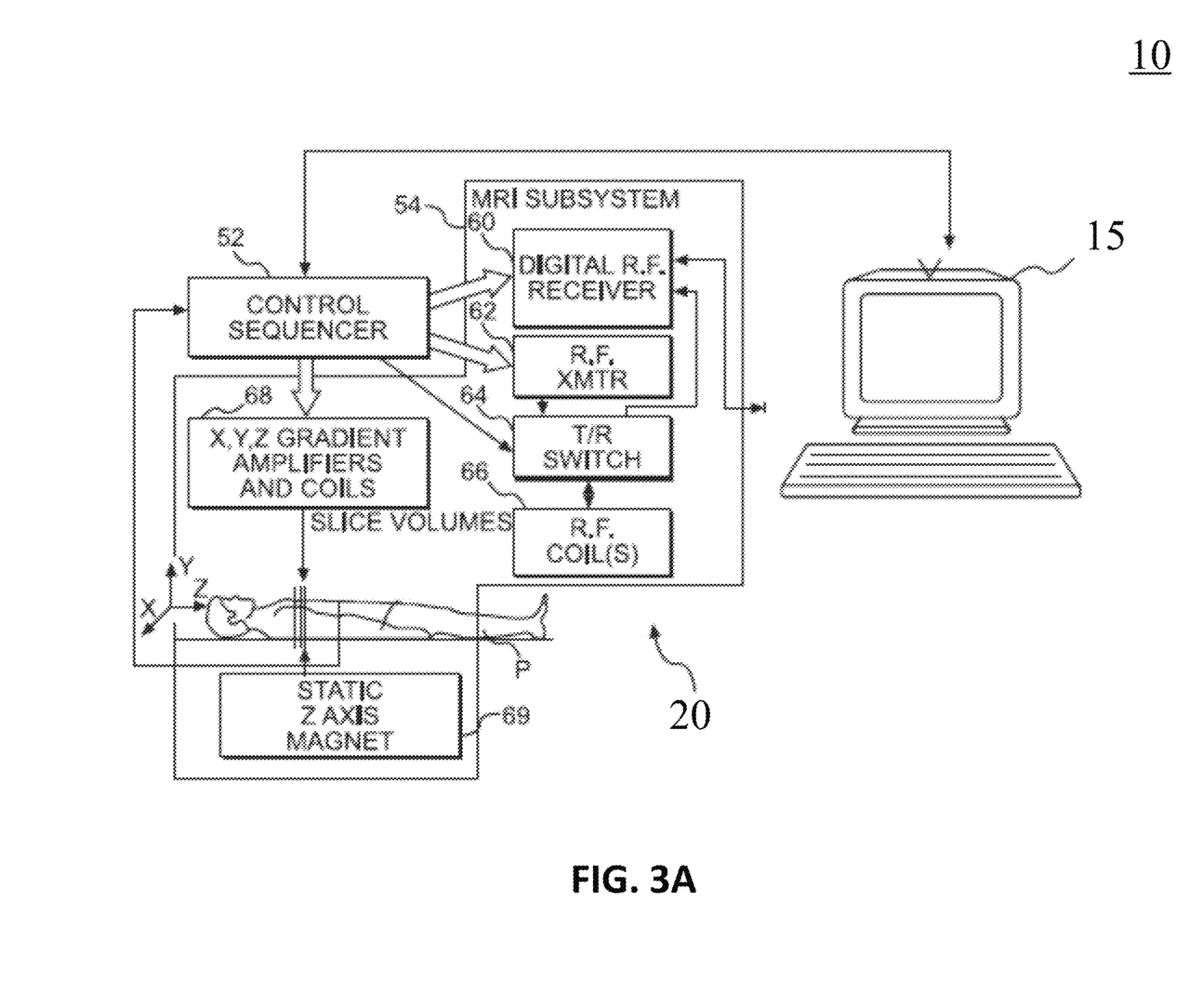
FIG. 3A is an illustration of a system for implementing methods according to example embodiments described herein.
Figure 3B:
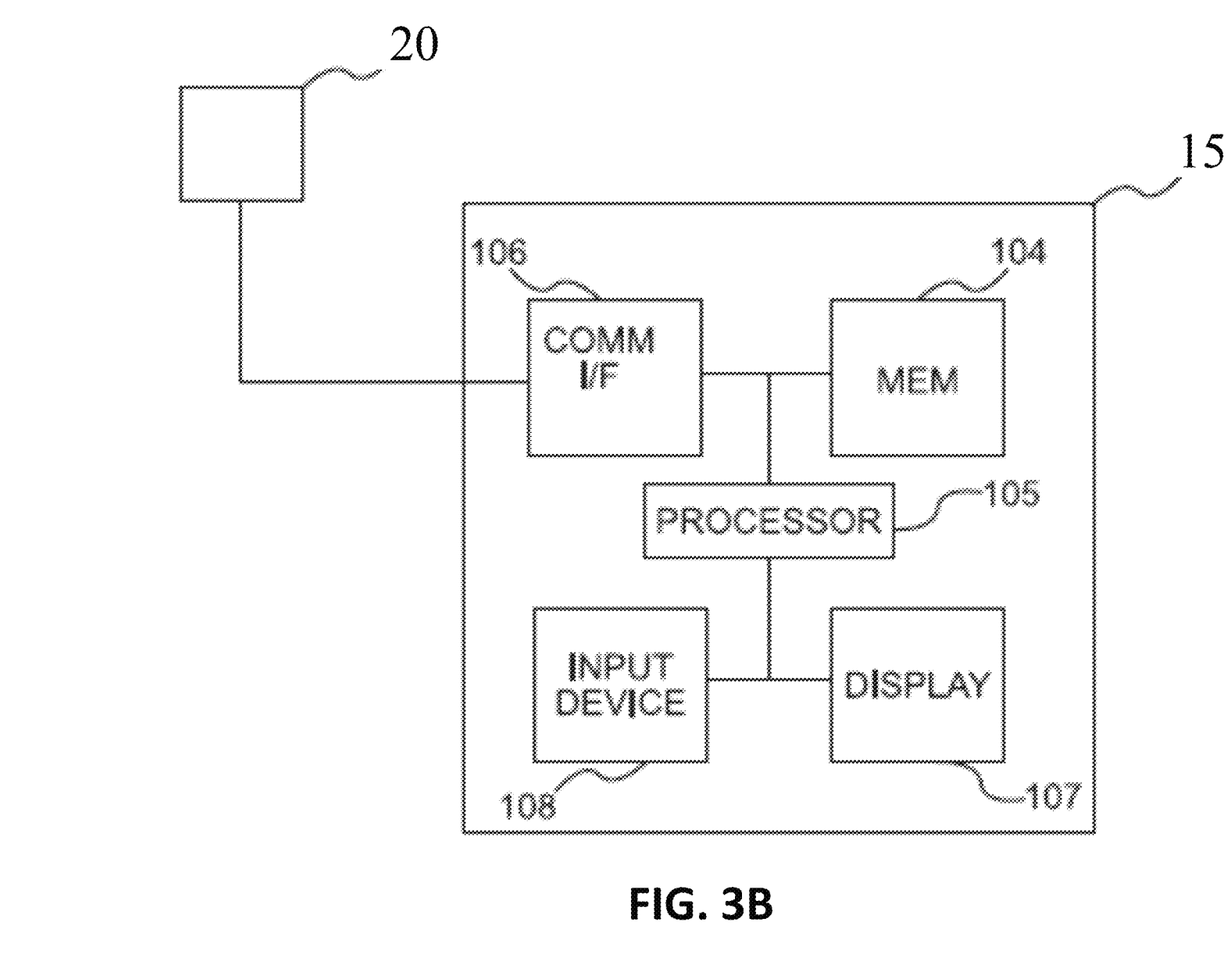
FIG. 3B is a block diagram illustrating an example embodiment of the system shown in FIG. 3A.

FIG. 3A illustrates a system for implementing methods according to example embodiments described herein. FIG. 3B is a block diagram illustrating an example embodiment of the system shown in FIG. 3A. Although one or more example embodiments may be described herein with regard to the systems shown in FIGS. 3A and 3B, example embodiments should not be limited to these examples.

Referring to FIGS. 3A and 3B, a system 10 may include an information (or image) processing device 15 and an acquisition device 20. The acquisition device 20 includes an MRI real-time control sequencer 52 and an MRI subsystem 54. The MRI subsystem 54 may include XYZ magnetic gradient coils and associated amplifiers 68, a static Z-axis magnet 69, a digital RF transmitter 62, a plurality of (e.g., N) RF receiver channels 60, transmit/receive switches 64, and RF coil(s) 66. In one example, the acquisition device 20 is a multichannel MRI device, which may include N independent RF receiver channels, wherein N is 4, 8, 16, 32, . . . , 128, etc. RF receiver channels include electronic chains for processing information received from a RF coil. Channels may include amplifiers, filters, analog-to-digital conversion circuitry, demodulation/mixer devices, and image processing capability. As is generally known, the output of each channel is generally a partial view of the entire anatomy or ROI being imaged. The partial views are subsequently combined to produce a final MR image of the entire anatomy or ROI. The acquisition device 20 may be configured to acquire MR images with multiple echoes. In one example, the acquisition device 20 may be configured to scan using a double-echo echoplanar imaging (EPI) sequence. Example embodiments should not, however, be limited to this example.

The MRI subsystem 54 may be controlled in real-time by the MRI real-time control sequencer 52 to generate and measure magnetic field and radio frequency emissions that stimulate nuclear magnetic resonance ("NMR") phenomena in an object P (e.g., a human or other living body) to be imaged.

The information processing device 15 may implement methods for processing medical image data, such as multi-echo MR data. In one example, the information processing device 15 may process the multi-echo MR data obtained by the acquisition device 20 to obtain a resultant phase image of an anatomy or ROI.

In FIGS. 3A and 3B, the acquisition device 20 is shown as a separate unit from the information processing device 15. It is, however, possible to integrate the information processing device 15 as part of the acquisition device 20.

As shown in FIG. 3B, the information processing device 15 may include a memory 104, processing circuitry including at least one processor such as processor 105, a communication interface 106 and/or an input device 108. The memory 104 may include various special purpose program code including computer executable instructions which may cause the processor 105 of the information processing device 15 to perform one or more of the methods according to example embodiments described herein. The acquisition device 20 may provide the medical data to the information processing device 15 via the communications interface 106. The communications interface 106 may be wired or wireless communications interface using any known communication methodology or technology. The input device may include one or more of a keyboard, mouse, touch screen, etc. In some example embodiments, the information processing device 15 may additionally include a display 107 that may be configured to output information about one or more of an imaging process, the information processing device 15, or the acquisition device 20.

As mentioned similarly above, one or more example embodiments provide mechanisms for generating phase images (medical images) of a body part, anatomy or ROI of a patient (e.g., human, animal, etc.) or other object with reduced noise by practically applying one or more of the concepts discussed above to multi-channel MR acquisition data for the ROI.

Figure 4:
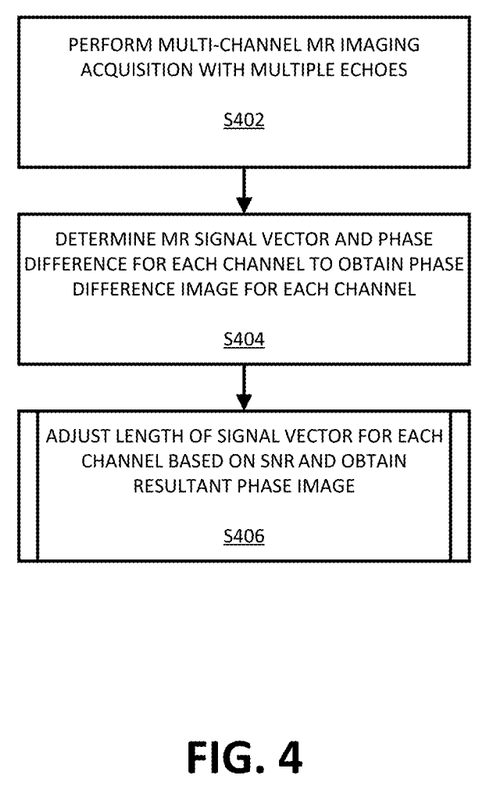
FIG. 4 is a flow chart illustrating a method according to example embodiments.

FIG. 4 is a flow chart illustrating a method for generating a resultant phase image of a ROI of a patient according to example embodiments. For example purposes, the example embodiment shown in FIG. 4 will be discussed with regard to the systems shown in FIGS. 3A and 3B. In some cases, the example embodiment shown in FIG. 4 will be discussed with regard to dual-echo MR imaging. Example embodiments should not, however, be limited to this example.

In the following discussion, where applicable q is the channel index for the N independent RF receiver channels 60 at the acquisition device 20, and 'i' is the echo index identifying an echo amongst the multiple echoes used in the MR imaging acquisition.

Referring to FIG. 4, at S402 the acquisition device 20 performs (e.g., at the control of the MRI real-time control sequencer 52) multi-channel MR imaging acquisition with multiple echoes to obtain multi-echo MR imaging data for each of the N receiver channels 60. In one example, the acquisition device 20 may perform dual-echo MR imaging to obtain dual-echo MR imaging data for each of the N receiver channels 60. In one example the MR imaging data may include one or more of the MR signal vectors described herein. Because methods for multi-channel MR imaging acquisition such as this are known, a detailed discussion is omitted. Also at S402, the acquisition device 20 provides the multi-echo MR imaging data to the information processing device 15.

At S404, the information processing device 15 determines a phase difference image for each channel q based on the multi-echo MR imaging data obtained at S402. Again with regard to dual-echo MR imaging, for example, the information processing device 15 may obtain the phase difference image for each channel q by calculating a Hermitian Inner Product (HiP) between the two echoes (component MR signal vectors $z_{q1}$ and $z_{q2}$) for the respective channel q to obtain a resultant MR signal vector $z_q$ for the channel as shown below in Equation (10), and then determining the phase difference $\theta_q$ for the channel q based on the resultant MR signal vector $z_q$ as shown below in Equation (11).

$$z_q = z_{q1}^* z_{q2} = |z_{q1}|e^{-i\theta_{q1}}|z_{q2}|e^{i\theta_{q2}} = |z_{q1} z_{q2}|e^{i(\theta_{q2}-\theta_{q1})} \quad (10)$$

$$\theta_q = \arg(z_q) = \theta_{q2} - \theta_{q1} \quad (11)$$

Because methods for determining phase difference and phase difference images for individual channels based on multi-echo MR imaging data are generally known, further discussion is omitted.

At S406, the information processing device 15 adjusts or scales the length of the resultant MR signal vector (and phase difference image) for each channel based on the SNR (e.g., the square of the SNR) of one or more (e.g., each) of the echoes (SNR of the magnitude of the MR signal vector) of the respective channel to obtain an adjusted MR signal vector (adjusted or scaled phase difference image) for the channel. Also at S406, the adjusted MR signal vectors (or phase difference images) for the N receiver channels 60 are then averaged using vector addition to generate the resultant phase and to reconstruct the corresponding phase image for the ROI.

As is generally known, in multi-echo MR imaging, each echo may have a different SNR (e.g., the temporal first echo may have higher SNR than the temporal second echo since the signal may decay more for the second echo). As a result, according to one or more example embodiments, the lengths of the MR signal vectors for each channel may be adjusted based on the SNR for each of the multiple echoes utilized in the MR image acquisition on the channel. As is also generally known, the SNR for each echo (e.g., the SNR of the magnitude of the MR signal vector) on each channel may be measured separately and known at the information processing device 15.

An example embodiment of S406 will be discussed in more detail with regard to FIG. 5.

Figure 5:
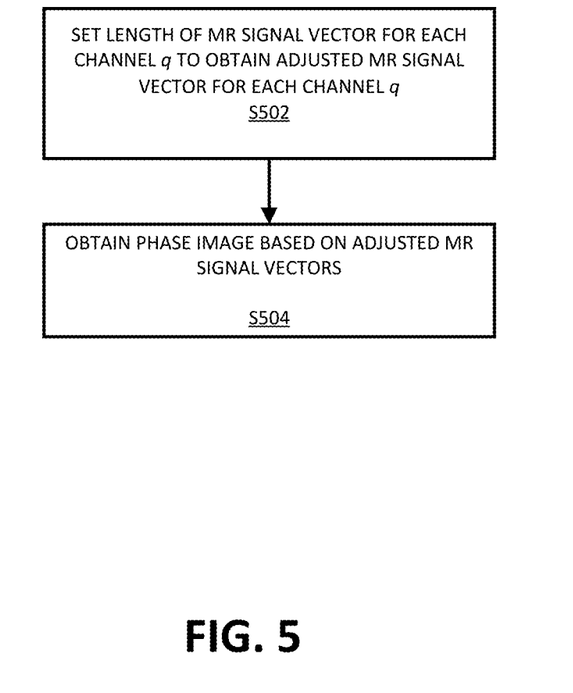
FIG. 5 is a flow chart illustrating another method according to example embodiments.

FIG. 5 illustrates an example embodiment of a method for adjusting MR signal vectors and obtaining a resultant phase image of an ROI at S406 in FIG. 4. As with the example embodiment in FIG. 4, the example embodiment shown in FIG. 5 will be discussed with regard to the systems shown in FIGS. 3A and 3B. Example embodiments should not, however, be limited to this example.

Referring to FIG. 5, at S502 the information processing device 15 adjusts the length of the resultant MR signal vector for each channel such that the length of the respective resultant MR signal vector is inversely proportional to the variance of the phase of the resultant MR signal vector. In one example, for dual-echo imaging, the information processing device 15 may adjust the resultant MR signal vector $z_q$ by setting the length $|z_q|$ as shown below in Equation (12). Again, as mentioned above, q is the index of the channel and the right index (e.g., 1, 2) is the index of the echo.

$$|z_q| = \frac{1}{SNR_{q1}^2} + \frac{1}{SNR_{Q2}^2} \qquad (12)$$

Still referring to FIG. 5, at S504 the information processing device 15 obtains the resultant phase and corresponding phase image based on the adjusted MR signal vectors for each channel q. In one example, the information processing device 15 obtains the resultant phase and phase image by averaging (via vector addition) the adjusted MR signal vectors across the plurality of channels to obtain a resultant scaled MR signal vector as shown below in Equation (13), wherein z_adj$_q$ is the adjusted resultant MR signal vector for the channel q and z_adj is the averaged MR signal vector averaged across the N receiver channels 60.

$$z\_adj = z\_adj_1 + z\_adj_2 + \ldots + z\_adj_q + \ldots + z\_adj_{N-1} + z\_adj_N \qquad (13)$$

In FIG. 5, in the more specific example in which the phase difference image for a channel is obtained by calculating the HiP between MR signal vectors for the two echoes, the length of the resultant signal vector $z_q$ for each channel q may be adjusted by, for example, setting the length of the HiP to $$\frac{1}{SNR_{q1}^2} + \frac{1}{SNR_{q2}^2} \text{ at } S502,$$

and then averaging the adjusted HiP for each channel q across the N receiver channels 60 via vector addition to generate the resultant phase and corresponding phase image of the ROI at S504.

Example embodiments described herein have been applied in a real-world scan, in which an anthropomorphic head phantom was scanned using a double-echo (TE=8.48, 16.96 ms) echo-planar imaging (EPI) sequence at an in-plane acceleration factor of 6 with a 32-channel coil (N=32). To determine the SNR of the magnitude of the MR signal vectors, the same scan was acquired 16 times. Images were saved for each individual channel. In this example, averages and standard deviations were calculated from the 16 measurements of the magnitude images. Then, a full set of complex images (2 echoes and 32 channels) were constructed by taking the SNR=(average/standard deviation) as the magnitude |z| and taking the phase of the first measurement as the phase θ. For each channel, the HiP was performed between the two echoes for each of the 32 channels, and then the magnitude (length) $|z_q|$ of the HiP of each channel q was set to $$|z_q| = \frac{1}{SNR_{q1}^2} + \frac{1}{SNR_{Q2}^2}.$$

Finally, the scaled HiPs were summed over all channels to compute the resultant phase and obtain or construct the resultant phase image. The phase uncertainty σ(θ) for the resultant phase was then calculated according to Equation (14) shown below.

$$\sigma(\theta) = \frac{1}{\sqrt{\sum \frac{1}{\sigma^2(\theta_q)}}} = \frac{1}{\sqrt{\sum \frac{1}{\frac{1}{SNR_{q1}^2} + \frac{1}{SNR_{Q2}^2}}}} \qquad (14)$$

Figure 6:
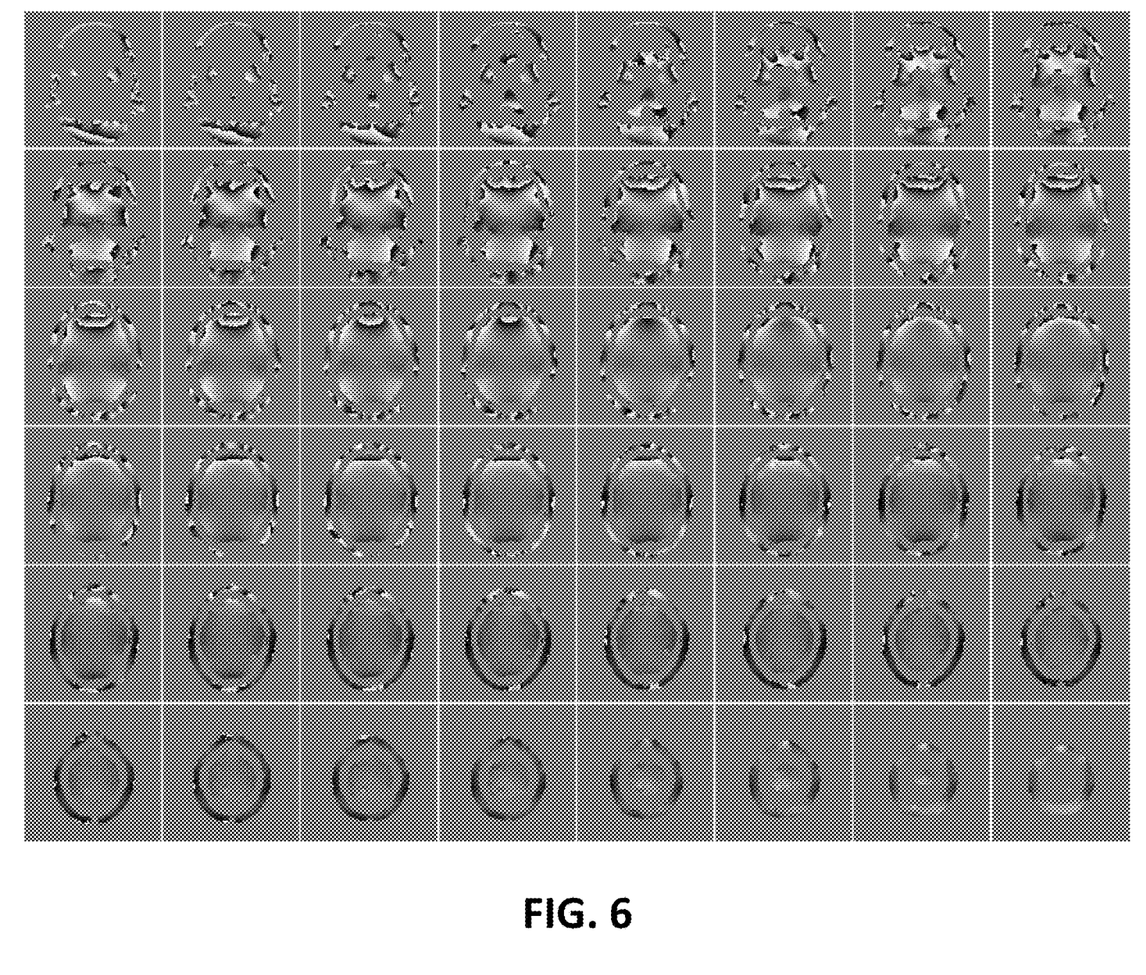
FIG. 6 illustrates example phase difference across channels generated in accordance with example embodiments.
Figure 7:
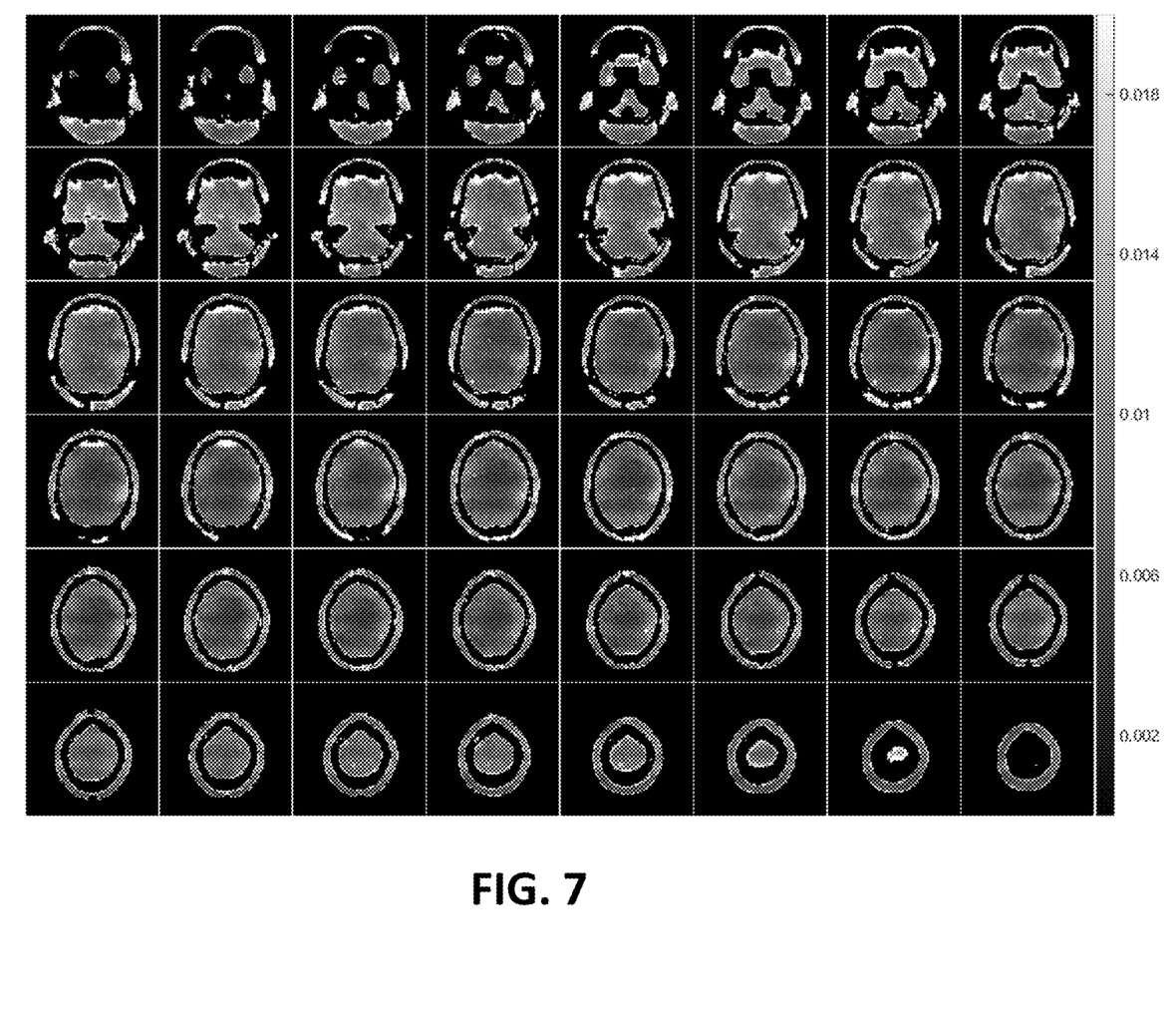
FIG. 7 illustrates uncertainty of phase in radians computed in accordance with example embodiments.

The results of this scan are illustrated in FIGS. 6 and 7. Specifically, FIG. 6 illustrates the phase difference combined across channels using the scaled signal vectors. More specifically, FIG. 6 is obtained from the phase results using relative lengths of vectors from different receive channels according to Equation (15) shown below. As can be appreciate, Equation (15) is based on Equation (12) discussed above, wherein the channel index q=1 and q=2.

$$r = \frac{|z_2|}{|z_1|} = \frac{\sigma^2(\theta_1)}{\sigma^2(\theta_2)} = \frac{\frac{1}{SNR_{11}^2} + \frac{1}{SNR_{12}^2}}{\frac{1}{SNR_{21}^2} + \frac{1}{SNR_{22}^2}} \qquad (15)$$

FIG. 7 illustrates the uncertainty of phase, in radians, computed using Equation (14) discussed above, wherein each individual SNR (e.g., $SNR_{q1}$) is computed from repetitive scans.

As can be appreciated from review of FIGS. 6 and 7, the uncertainty "hot spots" in FIG. 7 coincide with areas of rapid change in phase as shown in FIG. 6.

As noted above, one or more example embodiments provide mechanisms to improve accuracy and reduce noise in phase images, thereby improving phase-related MR applications, such as field mapping and the like.

Although example embodiments are described in some instances with regard to dual-echo imaging, example embodiments should not be limited to this example. Rather, example embodiments may be applicable to other phase-related algorithms where phase difference and/or vector addition are used to suppress noise, such as the local phase correction methods where accumulated phase difference is used for Nyquist ghost correction in EPI.

In another example, example embodiments may be applicable in phase contrast MR angiography (PC MRA), wherein, for example, two scans may be performed with opposite gradient settings. In that case, the two scans with opposite gradients would be analogous to the two echoes in the dual-echo case. In this example, the HiP is used to extract the phase difference (representing blood velocity) from each channel in a manner similar to that discussed above, and then the signal vector for each channel may be scaled based SNR of the respective channel, and then the scaled signal vectors may be combined in the same or substantially the same way as in the dual-echo example embodiments discussed herein. Unlike the dual-echo embodiments, for PC MRA the two scans may have essentially the same SNR, and thus, a SNR for each channel may be used for scaling, rather than a SNR for each scan.

The following is a list of non-limiting illustrative embodiments disclosed herein:

Illustrative embodiment 1. A method of generating a phase image of a region of interest of a patient, the method comprising: obtaining a plurality of adjusted magnetic resonance (MR) signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels; and generating the phase image based on the plurality of adjusted MR signal vectors.

Illustrative embodiment 2. The method of illustrative embodiment 1, wherein the adjusting comprises: adjusting the length of the first of the plurality of MR signal vectors such that the length of the first of the plurality of MR signal vectors is inversely proportional to a variance of a phase of the first of the plurality of MR signal vectors.

Illustrative embodiment 3. The method of any of the preceding illustrative embodiments, wherein the length of the first of the plurality of MR signal vectors is adjusted based on a square of the first signal-to-noise ratio and a square of the second signal-to-noise ratio.

Illustrative embodiment 4. The method of any of the preceding illustrative embodiments, wherein the length of the first of the plurality of MR signal vectors is adjusted by setting the length of the first of the plurality of MR signal vectors equal to a sum of a reciprocal of the square of the first signal-to-noise ratio and a reciprocal of the square of the second signal-to-noise ratio.

Illustrative embodiment 5. The method of any of the preceding illustrative embodiments, wherein the generating comprises: averaging the plurality of adjusted MR signal vectors across the plurality of channels to obtain a resultant scaled MR signal vector.

Illustrative embodiment 6. The method of illustrative embodiment 5, wherein the plurality of adjusted MR signal vectors are averaged across the plurality of channels using vector addition.

Illustrative embodiment 7. The method of any of the preceding illustrative embodiments, wherein the first component MR signal vector is a first echo and the second component MR signal vector is a second echo.

Illustrative embodiment 8. The method of any of the preceding illustrative embodiments, further comprising: calculating a Hermitian Inner Product (HiP) between the first component MR signal vector and the second component MR signal vector to obtain the first of the plurality of MR signal vectors.

Illustrative embodiment 9. The method of illustrative embodiment 8, wherein the length of the first of the plurality of MR signal vectors is adjusted by adjusting the HiP based on the first signal-to-noise ratio and the second signal-to-noise ratio.

Illustrative embodiment 10. The method of any of the preceding illustrative embodiments, further comprising: acquiring, via the MR imaging system, multi-echo MR imaging data for the region of interest using an echo-planar imaging (EPI) sequence, the multi-echo MR imaging data including the plurality of MR signal vectors.

Illustrative embodiment 11. An image processing system to generate a phase image of a region of interest of a patient, the image processing system comprising: a memory storing computer-readable instructions; and at least one processor configured to execute the computer-readable instructions to cause the image processing system to obtain a plurality of adjusted MR signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels, and to generate the phase image based on the plurality of adjusted MR signal vectors.

Illustrative embodiment 12. The image processing system of illustrative embodiment 11, wherein the at least one processor is configured to execute the computer-readable instructions to cause the image processing system to adjust the length of the first of the plurality of MR signal vectors such that the length of the first of the plurality of MR signal vectors is inversely proportional to a variance of a phase of the first of the plurality of MR signal vectors.

Illustrative embodiment 13. The image processing system of illustrative embodiment 11 or 12, wherein the at least one processor is configured to execute the computer-readable instructions to cause the image processing system to adjust the length of the first of the plurality of MR signal vectors based on a square of the first signal-to-noise ratio and a square of the second signal-to-noise ratio.

Illustrative embodiment 14. The image processing system of any of illustrative embodiments 11-13, wherein the at least one processor is configured to execute the computer-readable instructions to cause the image processing system to adjust the length of the first of the plurality of MR signal vectors by setting the length of the first of the plurality of MR signal vectors equal to a sum of a reciprocal of the square of the first signal-to-noise ratio and a reciprocal of the square of the second signal-to-noise ratio.

Illustrative embodiment 15. The image processing system of any of illustrative embodiments 11-14, wherein the at least one processor is configured to execute the computer-readable instructions to cause the image processing system to generate the phase image by averaging the plurality of adjusted MR signal vectors across the plurality of channels to obtain a resultant scaled MR signal vector.

Illustrative embodiment 16. The image processing system of illustrative embodiment 15, wherein the at least one processor is configured to execute the computer-readable instructions to cause the image processing system to average the plurality of adjusted MR signal vectors across the plurality of channels using vector addition.

Illustrative embodiment 17. The image processing system of any of illustrative embodiments 11-16, wherein the first component MR signal vector is a first echo and the second component MR signal vector is a second echo.

Illustrative embodiment 18. The image processing system of any of illustrative embodiments 11-17, wherein the at least one processor is configured to execute the computer-readable instructions to cause the image processing system to calculate a HiP between the first component MR signal vector and the second component MR signal vector to obtain the first of the plurality of MR signal vectors.

Illustrative embodiment 19. The image processing system of any of illustrative embodiments 11-18, wherein the at least one processor is configured to execute the computer-readable instructions to cause the image processing system to adjust the length of the first of the plurality of MR signal vectors by adjusting the HiP based on the first signal-to-noise ratio and the second signal-to-noise ratio.

Illustrative embodiment 20. An imaging system comprising: a MR acquisition device having a plurality of channels, the MR acquisition device configured to acquire multi-echo MR imaging data for a region of interest of a patient, the multi-echo MR imaging data including a plurality of MR signal vectors; and an image processing system to generate a phase image of the region of interest of the patient. The image processing system including a memory storing computer-readable instructions, and at least one processor. The at least one processor is configured to execute the computer-readable instructions to cause the image processing system to: obtain a plurality of adjusted MR signal vectors by adjusting lengths of the plurality of MR signal vectors, wherein a length of a first of the plurality of MR signal vectors is adjusted based on a first signal-to-noise ratio for a first component MR signal vector on a first of the plurality of channels and a second signal-to-noise ratio for a second component MR signal vector on the first of the plurality of channels; and generate the phase image based on the plurality of adjusted MR signal vectors.

It is understood by those familiar with the art that the system described herein may be implemented in hardware, firmware, or software encoded (e.g., as instructions executable by a processor) on a non-transitory computer-readable storage medium.

Although the present invention has been described in detail with reference to example embodiments, the present invention is not limited by the disclosed examples from which the skilled person is able to derive other variations without departing from the scope of the invention.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific structural and functional details disclosed herein are merely representative for purposes of describing example embodiments. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, at least one central processing unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

For example, when a hardware device is a computer processing device (e.g., a processor, central processing unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code.

Once the program code is loaded into a computer processing device, the computer processing device may be programmed to perform the program code, thereby transforming the computer processing device into a special-purpose computer processing device. In a more specific example, when the program code is loaded into a processor, the processor becomes programmed to perform the program code and operations corresponding thereto, thereby transforming the processor into a special-purpose processor. According to one or more example embodiments, at least one memory may include or store computer program code, and the at least one memory and the computer program code may be configured to, with at least one processor, cause an information processing device and/or an acquisition device to perform the necessary tasks. Additionally, the processor, memory and example algorithms, encoded as computer program code, serve as means for providing or causing performance of operations discussed herein.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer-readable recording mediums, including the tangible or non-transitory computer-readable storage media discussed herein.

Even further, any of the disclosed methods may be embodied in the form of a program or software. The program or software may be stored on a non-transitory computer-readable medium and is adapted to perform any one of the aforementioned methods when run on a computer device (a device including a processor). Thus, the non-transitory, tangible computer-readable medium, is adapted to store information and is adapted to interact with a data processing facility or computer device to execute the program of any of the above-mentioned embodiments and/or to perform the method of any of the above-mentioned embodiments.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of generating a phase image of a region of interest of a patient, the method comprising:
    obtaining a plurality of adjusted magnetic resonance (MR) signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels; and
    generating the phase image based on the plurality of adjusted MR signal vectors.

2. The method of claim 1, wherein the adjusting comprises:
    adjusting the length of the first of the plurality of MR signal vectors such that the length of the first of the plurality of MR signal vectors is inversely proportional to a variance of a phase of the first of the plurality of MR signal vectors.

3. The method of claim 1, wherein the length of the first of the plurality of MR signal vectors is adjusted based on a square of the first signal-to-noise ratio and a square of the second signal-to-noise ratio.

4. The method of claim 3, wherein the length of the first of the plurality of MR signal vectors is adjusted by setting the length of the first of the plurality of MR signal vectors equal to a sum of a reciprocal of the square of the first signal-to-noise ratio and a reciprocal of the square of the second signal-to-noise ratio.

5. The method of claim 1, wherein the generating comprises:
    averaging the plurality of adjusted MR signal vectors across the plurality of channels to obtain a resultant scaled MR signal vector.

6. The method of claim 5, wherein the plurality of adjusted MR signal vectors are averaged across the plurality of channels using vector addition.

7. The method of claim 1, wherein the first component MR signal vector is a first echo and the second component MR signal vector is a second echo.

8. The method of claim 1, further comprising:
    calculating a Hermitian Inner Product (HiP) between the first component MR signal vector and the second component MR signal vector to obtain the first of the plurality of MR signal vectors.

9. The method of claim 8, wherein the length of the first of the plurality of MR signal vectors is adjusted by adjusting the HiP based on the first signal-to-noise ratio and the second signal-to-noise ratio.

10. The method of claim 1, further comprising:
    acquiring, via the MR imaging system, multi-echo MR imaging data for the region of interest using an echo-planar imaging (EPI) sequence, the multi-echo MR imaging data including the plurality of MR signal vectors.

11. An image processing system to generate a phase image of a region of interest of a patient, the image processing system comprising:
    a memory storing computer-readable instructions; and
    at least one processor configured to execute the computer-readable instructions to cause the image processing system to
        obtain a plurality of adjusted MR signal vectors by adjusting lengths of a plurality of MR signal vectors acquired by a MR imaging system having a plurality of channels, a length of a first of the plurality of MR signal vectors being adjusted based on a first signal-to-noise ratio for a first component MR signal vector on a first of the plurality of channels and a second signal-to-noise ratio for a second component MR signal vector on the first of the plurality of channels, and
        generate the phase image based on the plurality of adjusted MR signal vectors.

12. The image processing system of claim 11, wherein the at least one processor is configured to execute the computer-readable instructions to cause the image processing system to adjust the length of the first of the plurality of MR signal vectors such that the length of the first of the plurality of MR signal vectors is inversely proportional to a variance of a phase of the first of the plurality of MR signal vectors.

13. The image processing system of claim 11, wherein the at least one processor is configured to execute the computer-readable instructions to cause the image processing system to adjust the length of the first of the plurality of MR signal vectors based on a square of the first signal-to-noise ratio and a square of the second signal-to-noise ratio.

14. The image processing system of claim 13, wherein the at least one processor is configured to execute the computer-readable instructions to cause the image processing system to adjust the length of the first of the plurality of MR signal vectors by setting the length of the first of the plurality of MR signal vectors equal to a sum of a reciprocal of the square of the first signal-to-noise ratio and a reciprocal of the square of the second signal-to-noise ratio.

15. The image processing system of claim 11, wherein the at least one processor is configured to execute the computer-readable instructions to cause the image processing system to generate the phase image by averaging the plurality of adjusted MR signal vectors across the plurality of channels to obtain a resultant scaled MR signal vector.

16. The image processing system of claim 15, wherein the at least one processor is configured to execute the computer-readable instructions to cause the image processing system to average the plurality of adjusted MR signal vectors across the plurality of channels using vector addition.

17. The image processing system of claim 11, wherein the first component MR signal vector is a first echo and the second component MR signal vector is a second echo.

18. The image processing system of claim 11, wherein the at least one processor is configured to execute the computer-readable instructions to cause the image processing system to calculate a HiP between the first component MR signal vector and the second component MR signal vector to obtain the first of the plurality of MR signal vectors.

19. The image processing system of claim 18, wherein the at least one processor is configured to execute the computer-readable instructions to cause the image processing system to adjust the length of the first of the plurality of MR signal vectors by adjusting the HiP based on the first signal-to-noise ratio and the second signal-to-noise ratio.

20. An imaging system comprising:
    a MR acquisition device having a plurality of channels, the MR acquisition device configured to acquire multi-echo MR imaging data for a region of interest of a patient, the multi-echo MR imaging data including a plurality of MR signal vectors; and
    an image processing system to generate a phase image of the region of interest of the patient, the image processing system including
        a memory storing computer-readable instructions, and
        at least one processor configured to execute the computer-readable instructions to cause the image processing system to
            obtain a plurality of adjusted MR signal vectors by adjusting lengths of the plurality of MR signal vectors, wherein a length of a first of the plurality of MR signal vectors is adjusted based on a first signal-to-noise ratio for a first component MR signal vector on a first of the plurality of channels and a second signal-to-noise ratio for a second component MR signal vector on the first of the plurality of channels, and
            generate the phase image based on the plurality of adjusted MR signal vectors.

* * * * *